United States Patent Office 2,811,516
Patented Oct. 29, 1957

2,811,516

IODO CARBOXYMETHYL DEXTRAN AND METHODS OF MAKING IT

Leo J. Novak, Dayton, Ohio, assignor to The Commonwealth Engineering Company of Ohio, Dayton, Ohio, a corporation of Ohio No Drawing. Application September 21, 1955, Serial No. 535,728

12 Claims. (Cl. 260—209)

This invention relates to carboxymethyl iodine compounds or absorption complexes and to methods of producing them.

As is well known, iodine has certain undesirable properties. It often exhibits an irritating effect on the skin and delicate tissues, and is toxic if taken internally. These properties have limited both the internal and external use of iodine in its free and combined form, since the use of iodine in a quantity sufficient for it to exert its curative properties frequently results in serious damage to the skin or to body organs.

Various attempts have been made to prevent or inhibit the development of serious damage resulting from the caustic, irritating and toxic effects of iodine. Thus, it has been proposed to use iodine in the form of mixtures thereof with organic and inorganic adjuvants or of compounds of iodine with organic and inorganic bases. However, for the most part, the known chemical compounds and physical mixtures have the drawback of also being toxic or of comprising the iodine only in small or ineffective amounts. There has been, also, the problem of controlling the composition of the chemical compounds in those instances involving chemical reaction of the iodine with another substance.

One object of this invention is to provide new chemical compounds containing iodine which are non-irritating and the M. L. D. and L. D.$_{50}$ of which can be controlled.

Another object is to provide a series of new chemical entities of varying, controllable iodine content.

A further object is to provide water-soluble iodine containing compounds.

These and other objects are accomplished by the present invention which provides carboxymethyl dextran-iodine compounds obtained by combining iodine with carboxymethyl dextran containing some free hydroxyl groups, whereby hydroxyl groups on the anhydroglucose units of the dextran are replaced by iodine.

The carboxymethyl dextran may be obtained as described in the pending application of L. J. Novak et al., Serial No. 346,016, filed March 31, 1953. According to that method, the selected dextran and a carboxymethylating agent are reacted together in water containing strong alkali metal hydroxide, the carboxymethyl group being substituted for one or more hydroxyl groups of the dextran molecule.

Suitable carboxymethylating agents are chloracetic acid, sodium chloracetate and chloracetamide.

Suitable hydroxides are sodium, potassium and lithium hydroxide.

In a preferred embodiment, an aqueous solution or suspension of the dextran containing an excess of sodium or potassium hydroxide and an excess of sodium or potassium chloracetate is heated at 50–100° C. for ten minutes to two hours. The molar ratio of sodium or potassium chloracetate to dextran may be between 2:1 and 12:1, the molar ratio of sodium or potassium hydroxide to dextran may be between 5:1 and 15:1, the molar ratio of water to dextran between 70:1 and 120:1.

The proportions and heating time are selected and correlated to yield a carboxymethyl dextran containing an average of 0.5 up to but not more than 2.0 carboxymethyl groups per anhydroglucose unit of the dextran.

The reaction product is a viscous mass comprising the alkali metal salt of the dextran ether. The salt is precipitated from the crude product by means of a water-miscible aliphatic alcohol or ketone.

The free ether is recovered from the salt by dissolving the latter in water, acidifying to pH 2.0–3.0, and adding a water-miscible aliphatic alcohol or acetone to precipitate the ether.

The dextran converted to the carboxymethyl ether may be native, high molecular weight microbiologically produced dextran as biosynthesized from sucrose by the action of microorganisms of the *Leuconostoc mesenteroides* or *L. dextranicum* types or by their enzymes. Or it may be a partial hydrolyzate of the native dextran. In general, the dextran may have a molecular weight between 2000 and that of the native material. The presently preferred dextran is native, unhydrolyzed water-soluble dextran.

The following illustrates the production of a carboxymethyl dextran suitable for combination with iodine to produce the new compounds of the invention.

One hundred parts of particulate purified native (unhydrolyzed) water-soluble dextran were dissolved in 700 parts of water. One hundred and fifty parts of sodium hydroxide were dissolved in 150 parts of water, and the dextran and sodium hydroxide solutions were mixed together with agitation. Two hundred and twenty parts of monochloracetic acid were dissolved in 400 parts of water and 112.3 parts of anhydrous sodium carbonate were added to the solution. The resulting sodium chloracetate solution was then slowly added to the mixed dextran and sodium hydroxide solutions, and the mass was heated for one hour at 65° C. The reaction mass was then adjusted to pH of 3.0 with hydrochloric acid and poured slowly into 1500 parts of methanol. The precipitate was substantially freed of methanol and water by passage through squeeze rolls, then dried under vacuum and reduced to particulate condition (80-mesh) in a hammer mill. The ether thus obtained contained by analysis, an average of about 1.0 carboxymethyl group per anhydroglucose unit of the dextran.

The carboxymethyl dextran-iodine compounds may be prepared by dissolving the carboxymethyl dextran in water, adding powdered crystalline U. S. P. iodine or Lugol's solution to the dextran solution with stirring, holding the mixture, stirring being continued, until the iodine combines with the dextran ether to form a compound which is iodo-carboxymethyl dextran in solution. The solution may be used as such, after dilution with water, or the compound may be recovered by evaporation of the water, preferably by low temperature vacuum evaporation or by lyophilization.

The mass comprises the carboxymethyl dextran solution containing the iodine, or Lugol's solution and may be heated to 60–65° C. to expedite formation of the compound, if desired.

According to another embodiment, the carboxymethyl dextran is dispersed in an organic solvent which is a chlorine acceptor, such as pyridine, and which contains a sulfonic acid chloride. The latter reacts with the carboxymethyl dextran to produce the sulfonyl chloride thereof. The pyridine or the like is removed by distillation, the residue is dissolved in alcohol, the solution is neutralized, an alkali metal iodide such as sodium or potassium iodide is added, and the mass is heated at 80–120° C. for three to five hours or until the desired carboxymethyl dextran iodide is formed. The crude reaction product is worked up to recover the iodine-substituted ether.

Carboxymethyl dextran-iodine compounds of predetermined and controlled iodine content are obtained. A wide range of such compounds may be produced, adapted for specific purposes or uses depending on the D. S. of the starting carboxymethyl dextran with respect to carboxymethyl groups, the molecular weight of the dextran from which the ether is derived, and the average number of hydroxyl groups replaced by iodine.

The iodo-carboxymethyl dextran compound may contain 0.5 to 2.0 carboxymethyl groups and have an average of 1.0 to 2.5 hydroxyls replaced by iodine, per AGU. The ratio of carboxymethyl dextran to iodine or iodide used may be from 1:3 to 1:15.

The compounds may be used for any of the usual purposes to which iodine is adapted, and the compound selected may have a higher or lower iodine content as indicated for a particular curative or disinfectant effect. Aqueous solutions of the iodine-substituted carboxymethyl dextran may be used as X-ray contrast media which cause structures of the kidney to become visible under X-ray observation. The carboxymethyl dextran portion of the product is a carrier for and control of the release of the iodine to the site of application.

The following examples are illustrative of specific embodiments of the invention, it being understood that these examples are not limitative.

*Example I*

About 300 grams of carboxymethyl dextran (derived from native, unhydrolyzed water-soluble dextran and containing an average of about 1.0 carboxymethyl group per anhydroglucose unit) are dispersed in 2500 cc. of pyridine. The dispersion is cooled to —5° C. About 325 grams of p-toluene sulfonyl chloride are added in small increments over a period of about a half hour, and with continued stirring. The solution is let stand for about a half hour, after which the major portion of the free pyridine is distilled off under vacuum. The residue is dissolved in 500 cc. of alcohol, 500 cc. of water are added, and the solution is neutralized with a 20% sodium hydroxide solution using bromthymol blue as indicator. The solvent is taken off under vacuum, the residue is mixed with six liters of acetone, refrigerated for about 12 hours and then filtered to remove the insolubles. The acetone solution is concentrated to about 1.2 liters and 200 grams of sodium iodide are dissolved in it, the solution being then heated to about 100° C. for about four hours. After it is cooled, the reaction mass is filtered, the solvent taken off the filtrate under vacuum, and the residue dissolved in 700 cc. of water. The aqueous solution is extracted twice with methylene dichloride, brought to neutrality with aqueous sodium hydroxide and the water is distilled off under vacuum. The resulting water-soluble mono-iodo-carboxymethyl dextran is purified by dissolving it in water and reprecipitating it by means of alcohol.

Instead of using p-toluene sulfonyl chloride and forming the iodo-dextran ether through the intermediate sulfonyl chloride of the ether, the acid chlorides of other sulfonic acids may be used, such as the chlorides of ethane-sulfonic, methane-sulfonic, and benzenesulfonic acids. Instead of pyridine, other inert organic solvent chlorine acceptors may be used for dispersing the carboxymethyl dextran.

*Example II*

About 25 parts of carboxymethyl dextran (derived from native unhydrolyzed water-soluble dextran and containing an average of about 0.5 carboxymethyl groups per AGU) are dissolved in 500 parts of distilled water. About 10 parts of Lugol's solution (5% iodine, 10% potassium iodide) are added with stirring. The mass is heated at 50° C. for 2 hours, stirring being continued.

The resulting clear solution contains carboxymethyl dextran iodide in which an average of about two of the initially free hydroxyl groups per AGU of the dextran ether are replaced by iodine. The iodo-dextran ether can be recovered by precipitation from solution with methanol and purified by dissolution thereof in water and re-precipitation using methanol as the precipitant.

*Example III*

Example I is repeated, using carboxymethyl dextran derived from "clinical" dextran and containing an average of about 1.0 carboxymethyl group per AGU.

*Example IV*

Example II is repeated using 300 gms. of particulate water-soluble carboxymethyl dextran derived from native unhydrolyzed initially water-insoluble dextran and containing an average of 2.0 carboxymethyl groups per AGU.

*Example V*

About 300 gms. carboxymethyl dextran as in Example I are dispersed in about 4000 cc. of pyridine. The dispersion is cooled to —5° C. About 600 grams of ethanesulfonyl chloride are added in small increments over a period of about an hour, with continued stirring. The solution is let stand for about 50–60 minutes, after which the major portion of the pyridine is distilled off under vacuum. The residue is dissolved in 800 ccs. of alcohol, 800 ccs. of water are added, and the solution is neutralized with 20% sodium hydroxide solution. The solvent is taken off under vacuum, the residue mixed with 10 liters of acetone, refrigerated for about 12 hours and filtered to remove insolubles. The acetone solution is concentrated to about 3 liters and 400 grams of potassium iodide are dissolved in it. The solution is heated to about 100° C. for five hours. After cooling, the reaction mass is filtered, the solvent taken off the filtrate under vacuum, and the residue is dissolved in it. The solution is heated to about 100° C. for five hours. After cooling, the reaction mass is filtered, the solvent taken off the filtrate under vacuum, and the residue is dissolved in 1000 cc. of water. The aqueous solution is extracted twice with methylene dichloride, brought to neutral with aqueous sodium hydroxide, and the water is distilled off under vacuum. Water-soluble di-iodo-carboxymethyl dextran is obtained and purified to re-precipitation from aqueous solution, using alcohol as the precipitant.

*Example VI*

Example II is repeated using 300 grams of carboxymethyl dextran derived from hydrolyzed dextran of molecular weight about 2000 and containing an average of about 1.0 carboxymethyl group per AGU.

*Example VII*

Example II is repeated using 300 grams of the carboxymethyl ether of hydrolyzed dextran of molecular weight about 500,000 and containing an average of about 1.0 carboxymethyl group per AGU.

Since variations and changes may be made in carrying out the invention without departing from its spirit and scope it is to be understood that the invention is not intended to be limited except as defined in the appended claims.

What is claimed is:

1. As a new compound, iodo-carboxymethyl dextran containing per anhydroglucose unit an average of 0.5 to 2.0 carboxymethyl groups and in which an average of 1.0 to 2.5 of the hydroxyl groups initially present in the carboxymethyl dextran per anhydroglucose unit are replaced by iodine.

2. As a new compound, mono-iodo-carboxymethyl dextran.

3. As a new compound, di-iodo-carboxymethyl dextran.

4. The method of making iodo-carboxymethyl dextran which comprises dissolving carboxymethyl dextran containing, per anhydroglucose unit, an average of 0.5 to 2.0 carboxymethyl groups, in water, adding iodine to the solution, and heating the solution with stirring until the iodo-carboxymethyl dextran is formed.

5. The method according to claim 4, characterized in that the iodine is added to the carboxymethyl dextran solution in the form of a 5% solution thereof in 10% potassium iodide.

6. The method according to claim 4, characterized in that the carboxymethyl dextran is derived from native, unhydrolyzed dextran.

7. The method according to claim 4, characterized in that the carboxymethyl dextran is derived from clinical dextran.

8. The method of making iodo-carboxymethyl dextran which comprises dispersing carboxymethyl dextran containing per anhydroglucose unit an average of 0.5 to 2.0 carboxymethyl groups in a solution of a sulfonic acid chloride in an organic solvent that is a chlorine acceptor, removing a major portion of the solvent, dissolving the residue in alcohol, diluting the solution with water, removing the alcohol under vacuum, adding acetone to the residue, adding an alkali metal iodide to the acetone solution, heating the solution to 80–120° C. for three to five hours, and recovering the iodo-carboxymethyl dextran therefrom.

9. The method according to claim 8, characterized in that the organic solvent chlorine acceptor is pyridine.

10. The method according to claim 8, characterized in that the sulfonic acid chloride is p-toluenesulfonic acid chloride.

11. The method according to claim 8, characterized in that the carboxymethyl dextran is derived from native, unhydrolyzed water-soluble dextran.

12. The method according to claim 8, characterized in that the carboxymethyl dextran is derived from clinical dextran.

References Cited in the file of this patent

UNITED STATES PATENTS

| | | |
|---|---|---|
| 2,365,776 | Raymond et al. | Dec. 26, 1944 |
| 2,448,510 | Barham | Sept. 7, 1948 |
| 2,562,882 | Barham | Aug. 7, 1951 |
| 2,677,645 | Allen | May 4, 1954 |